US008575802B2

(12) United States Patent
Lueckenotto et al.

(10) Patent No.: US 8,575,802 B2
(45) Date of Patent: Nov. 5, 2013

(54) LOCOMOTIVE STARTER MOTOR

(75) Inventors: Philip E. Lueckenotto, Ozark, MO (US); Jason R. Shepperly, Buffalo, MO (US)

(73) Assignee: SRC Electrical LLC, Springfield, MO (US)

( * ) Notice: Subject to any disclaimer, the term of this patent is extended or adjusted under 35 U.S.C. 154(b) by 0 days.

(21) Appl. No.: 13/564,260

(22) Filed: Aug. 1, 2012

(65) Prior Publication Data

US 2012/0293029 A1 Nov. 22, 2012

Related U.S. Application Data

(63) Continuation of application No. PCT/US2011/023602, filed on Feb. 3, 2011.

(60) Provisional application No. 61/301,038, filed on Feb. 3, 2010.

(51) Int. Cl.
*H02K 5/173* (2006.01)

(52) U.S. Cl.
USPC .......... 310/90

(58) Field of Classification Search
USPC .......... 310/90
See application file for complete search history.

(56) References Cited

U.S. PATENT DOCUMENTS

| | | | | |
|---|---|---|---|---|
| 3,664,201 | A | 5/1972 | Vogel et al. | |
| 3,772,921 | A | 11/1973 | Carlson et al. | |
| 3,927,359 | A | 12/1975 | Chen | |
| 5,233,877 | A * | 8/1993 | Campbell | 74/7 C |
| 5,317,933 | A | 6/1994 | Rometsch | |
| 5,690,577 | A | 11/1997 | Enzmann et al. | |
| 5,789,821 | A | 8/1998 | Shiga et al. | |
| 6,672,818 | B1 * | 1/2004 | Terracol et al. | 417/420 |
| 2005/0024001 | A1 | 2/2005 | Donnelly et al. | |
| 2005/0045058 | A1 | 3/2005 | Donnelly et al. | |

OTHER PUBLICATIONS

PCT Written Opinion of International Application No. PCT/US2011/023602, mailed Aug. 16, 2012 (9 pages).
International Search Report for International Application No. PCT/US11/23602 mailed Apr. 8, 2011, (2 pages).

* cited by examiner

*Primary Examiner* — Tran Nguyen
*Assistant Examiner* — David Scheuermann
(74) *Attorney, Agent, or Firm* — Nixon & Vanderhye, P.C.

(57) ABSTRACT

In accordance with the present invention, provided is starter motor including a robust end housing or casing for carrying a needle bearing arrangement. The needle bearing arrangement is generally elongated and includes a plurality of rotatable members or rollers which allows wear to spread amongst all its members, thus increasing the field service life of the starter motor. In one aspect, the needle bearing arrangement is one roller bearing. In another aspect, the needle bearing comprises two roller bearings. Also, the drive end housing is longer and larger in diameter to accommodate the larger needle bearing arrangement.

15 Claims, 5 Drawing Sheets

FIG. 2
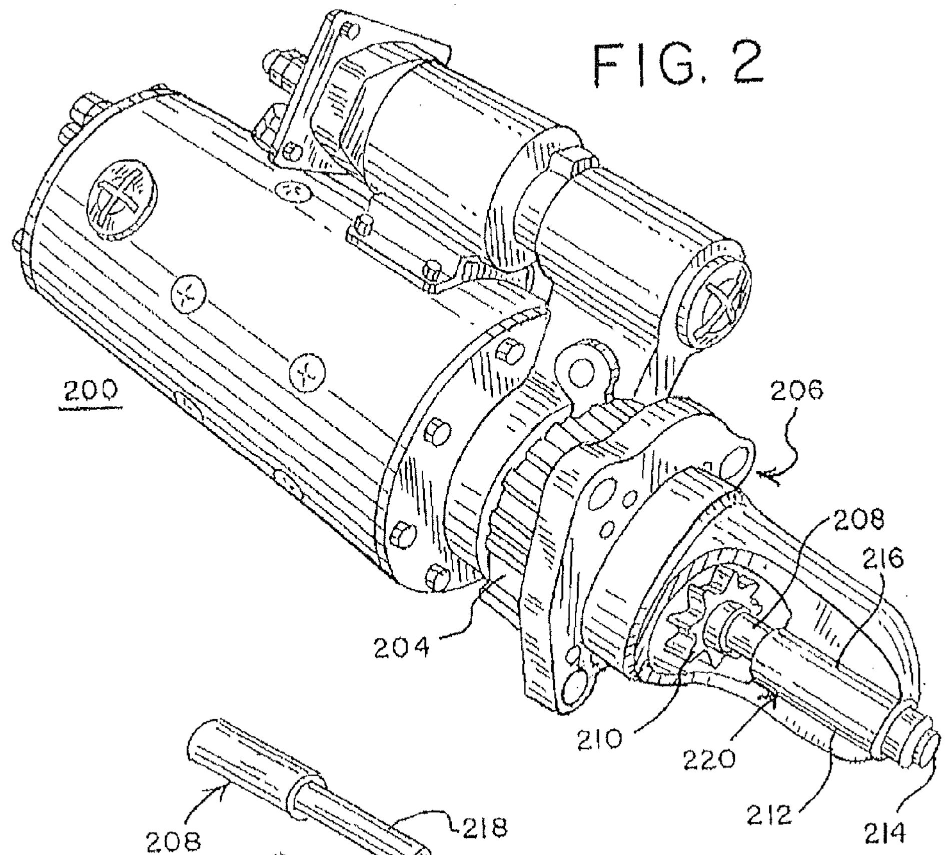
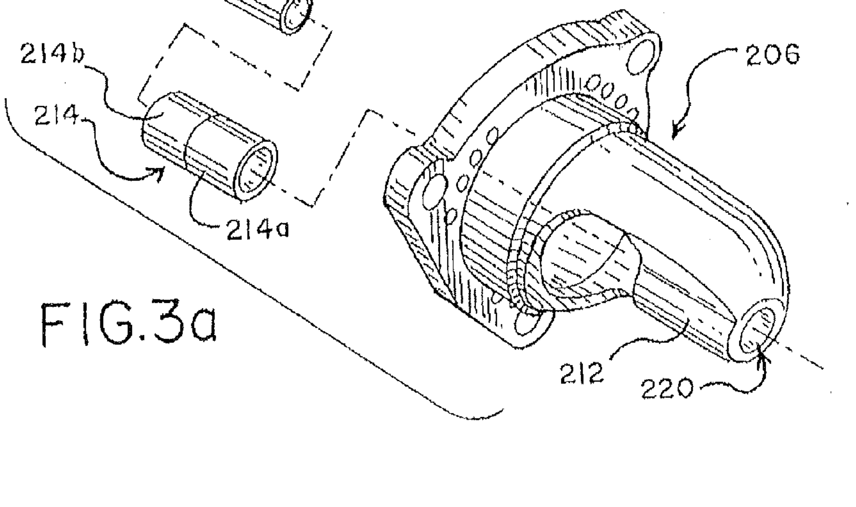
FIG.3a 100
200
106
108
112
114
120
206
208
212
214a
214b
216
218
220
$A_1$
$B_1$
$C_1$
$D_1$
$E_1$
$F_1$
$A_2$
$B_2$
$C_2$
$D_2$
$E_2$
$F_2$
$G_2$ 208
218
200
216
214b
206
220
214a
212

208
200
206
214a
212

106
120
114
112

206
220
214
212

LOCOMOTIVE STARTER MOTOR

CROSS-REFERENCE TO RELATED APPLICATIONS

The present patent application is a continuation of PCT Application PCT/US2011/023602 filed Feb. 3, 2011 and which claims the benefit under 35 U.S.C. §119(e) of U.S. Provisional Application Ser. No. 61/301,038 filed on Feb. 3, 2010, the complete disclosures thereof being incorporated herein by reference.

BACKGROUND OF INVENTION

The present invention is directed to a started motor for locomotive, and more particularly to a started motor including an improved, robust end casing for carrying an elongated needle bearing. The needle bearing may be in the form of a single roller bearing or multiple roller bearings. The present invention starter motor provides for a higher reliability system for heavy duty, high torque cranking applications with greater critical equipment uptime.

Locomotive engines are generally comprised of large, multi-cylinder diesel engines. When a diesel engine is started, its crankshaft must be rotated at a speed sufficient to compress the air in the cylinders to a pressure at which its temperature is sufficiently high to ignite fuel injected into the cylinders. Fuel may only be supplied after the starter motor has raised the speed of the engine above a predetermined value. Due to the unavoidable leakage of some air past the piston rings, it is essential that the engine be rotated at a high rate of speed, which requires a substantial power output from the starter motor. As a result, the amount of wear to the starter motor is generally significant, causing it to have a short lifespan in comparison to the diesel engine.

Failures of prior art starter motors in the field are generally due to length of service wear. For example, the prior art locomotive starter motor design commonly referred to as the 50MT 32 Volt Locomotive Starter Motor manufactured by Delco Remy, Inc (Pendelton, Ind., USA) was designed for intermittent duty. The prior art starter motor uses a bronze bushing, situated in the drive end of the starter assembly, as the stationary wear surface for the rotating shaft. For its original intended use of relatively few starts a day, the bronze bushing sufficed. However, with environmental regulations demanding train engine shut down when not in motion, the engine must be restarted several times a day. This causes the bronze bushing to be exposed to extensive wear, which usually occurs in an egg shape because the load is applied towards the closed side of the housing cranking cycle after cranking cycle. As a result of such bushing wear, the starter pinion does not correctly mesh with the engine ring gear, resulting in wearing out of the ring gear or damage to both the starter and ring gear.

In modern environmentally challenged diesel engine technology, greater demands on engine brings about greater demands on the starting technology. Today's engine requires significantly more starts and stops (e.g., 10 times per day as compared to 3.5 times per day). The need exists for a longer lasting starter motor, and specifically for a new bushing, which was the main wear item that generally caused the need for replacement. Therefore, it is an object of the present invention starter motor to provide for a higher reliability system for heavy duty, high torque cranking applications with greater critical equipment uptime.

Previous attempts have been made to strengthen the needle bearing and end casing. In such attempts, a higher capacity bearing was applied. The higher capacity was generally achieved by increasing the cross-sectional diameter and area of the needle bearing and associated housing parts. It was thought that by increasing the cross-sectional diameter and area of all parts, wear would be decreased and the needle bearing would have a longer lifespan. However, when this higher capacity needle hearing was applied to the starter motor discussed above, it caused the engine to fail. Specifically, the needle bearing and associated starter motor housing did not meet the size constraints of the locomotive. Therefore, it is an object of the present invention to not only provide for a higher reliability system, but to also meet the size constraints of the locomotive engine.

SUMMARY OF INVENTION

In accordance with the present invention, provided is starter motor including a robust end housing or casing for carrying a needle bearing arrangement. The needle bearing arrangement is elongated and includes a plurality of rotatable members or rollers which allows wear to spread amongst all its members, thus increasing the field service life of the starter motor. In one aspect, the needle bearing arrangement is one elongated roller bearing. In another aspect, the needle hearing arrangement comprises two roller bearings. Also, the drive end housing is longer and larger in diameter to accommodate the large needle bearing arrangement. The drive shaft rotates inside the needle bearing assembly. The needle bearing assembly housing is a press fit into the drive end housing.

BRIEF DESCRIPTION OF THE DRAWINGS

FIG. 2 is a perspective view the present invention locomotive starter motor.

FIG. 3*a* is an exploded view of an embodiment of the end casing of the present invention locomotive starter motor.

DETAILED DESCRIPTION OF THE DRAWINGS

Embodiments of the present invention relate to a locomotive starter motor arrangement. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein. Advantages of the present invention will now be described in detail with references to the accompanying drawings.

Figure 1B:
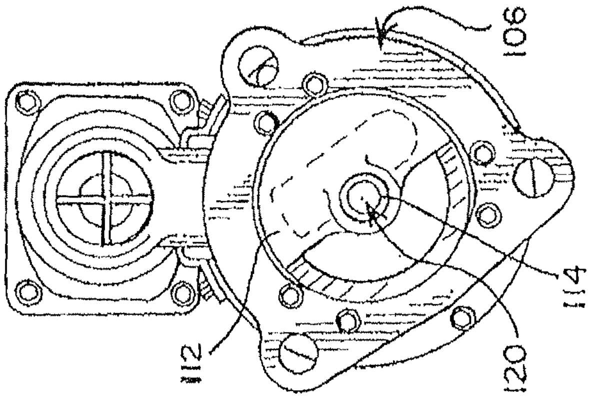
FIG. 1b PRIOR ART
FIG. 1*b* is a side view of another aspect of the prior art locomotive starter motor of FIG. 1*a*.
Figure 1A:
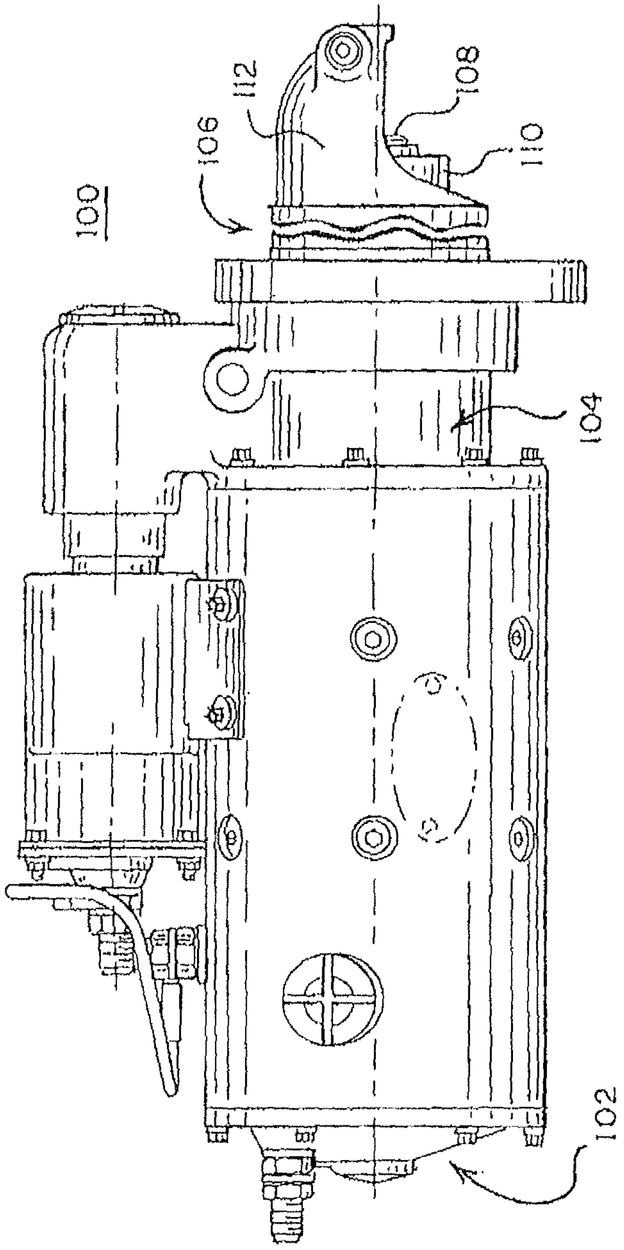
FIG. 1a PRIOR ART
FIG. 1*a* is a side view of a prior art locomotive starter motor.

FIG. 1 illustrates a prior art locomotive starter motor 100 commonly referred to as the 50MT 32 Volt Locomotive Starter Motor manufactured by Delco Remy, Inc. The prior art starter motor 100 generally includes a motor 102 having an armature 104 within the housing 106 for driving a shaft 108 therein. The shaft 108 carries a pinion 110 which engages a ring gear of an engine to be cranked or started. The shaft 108 is supported for rotation by a bushing 114 carried by an end casing 112 in a bore 120 defined therein and attachable to the housing 106 at the drive end of the assembly. The prior art starter motor 100 uses a bronze bushing 114 as the stationary wear surface for the rotating shaft 108.

The life of the prior art starter motor 100 is designed at approximately 2500 cranking cycles, which amounts to about 3.5 starts per day for about 2 years. As described above, for its original intended use of relatively few starts a day, the bronze hushing sufficed. However, with environmental regulations demanding train engine shut down when not in motion, the engine must be restarted several times a day. This causes the bronze bushing to be exposed to extensive wear, which usually occurs in an egg shape because the load is applied towards the closed side of the housing cranking cycle after cranking cycle. As a result of such bushing wear, the starter pinion does not correctly mesh with the engine ring gear, resulting in wearing out of the ring gear or damage to both the starter and ring gear. Specifically, the bushing is generally situated near the load. With high loads and misalignment, high contact stresses are generated across the raceway and at the edge of contact thereby resulting in increased wear.

The present invention starter motor, illustrated in FIG. 2, generally includes a motor having an armature 204 within the housing 206 for driving a shaft 208 therein. The shaft 208 carries a pinion 210 which engages a ring gear of an engine to be cranked or started. However, in contrast to the prior art starter motor 100 of FIG. 1, the present invention locomotive starter motor arrangement 200 includes a robust end casing 212 for carrying an elongated needle bearing arrangement 214, which supports the shaft 208 for rotation. As shown in FIGS. 3, 7*b* and 8*b*, the shaft 208 is supported for rotation by the elongated needle bearing arrangement 214. The robust end easing 212 is attachable to the housing 206 at the drive end of the assembly 200. The shaft 200 rotates inside the elongated needle bearing arrangement 214, which may be press fit into the end casing 212.

Figures 3B, 3C, 3D, 3E:
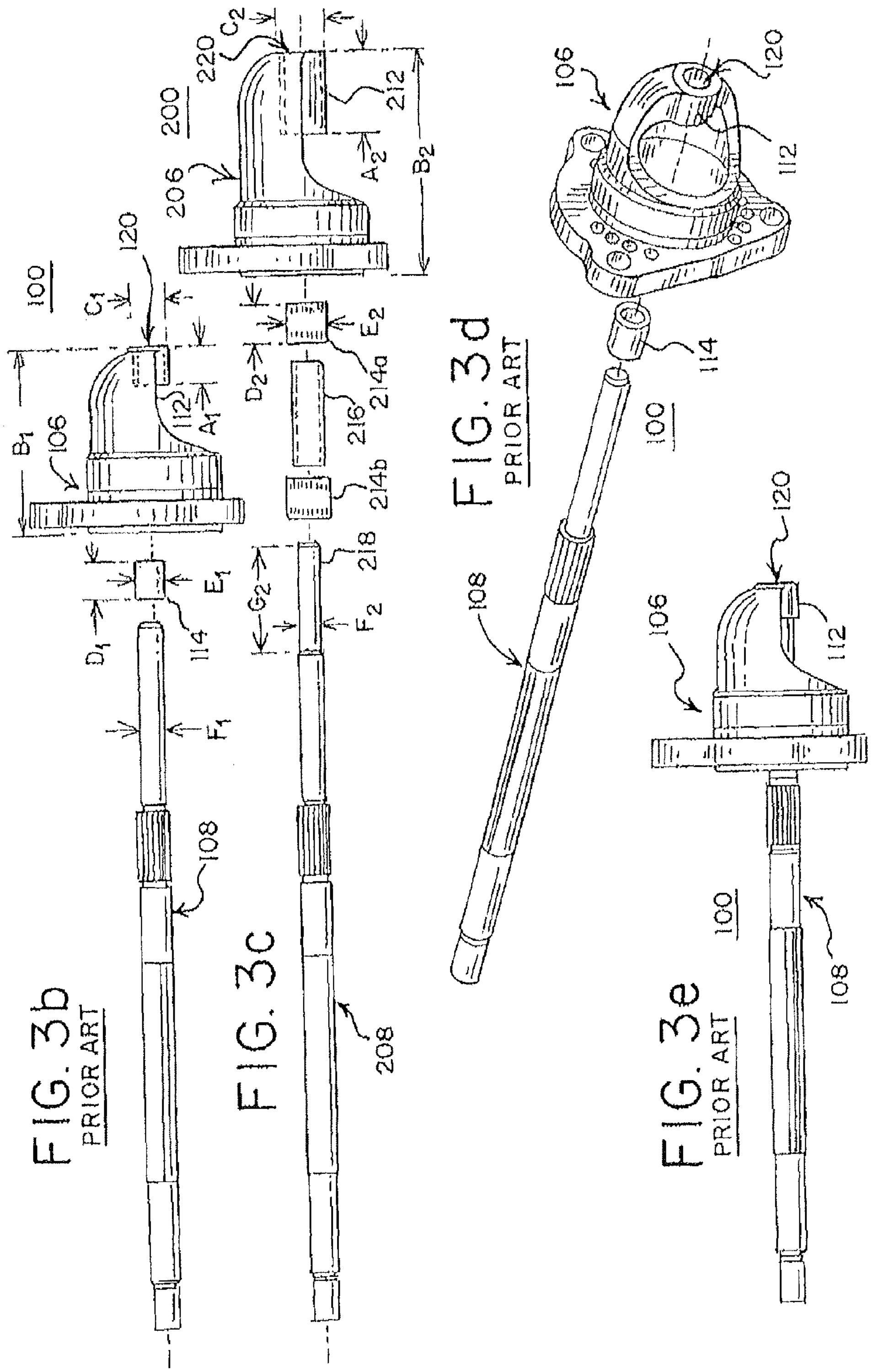
FIG. 3b PRIOR ART
FIG. 3d PRIOR ART
FIG. 3e PRIOR ART
FIG. 3*b* is an exploded view of the end casing of the prior art locomotive starter motor of FIG. 1*a*.
FIG. 3*c* is another exploded view of the embodiment of the end casing of FIG. 3*a*.
FIG. 3*d* is another exploded view of the end casing of the prior art locomotive starter motor of FIG. 1*a*.
FIG. 3*e* is a side view of the prior art locomotive starter motor of FIG. 1*a*.
Figures 3F, 3G, 4A, 4B:
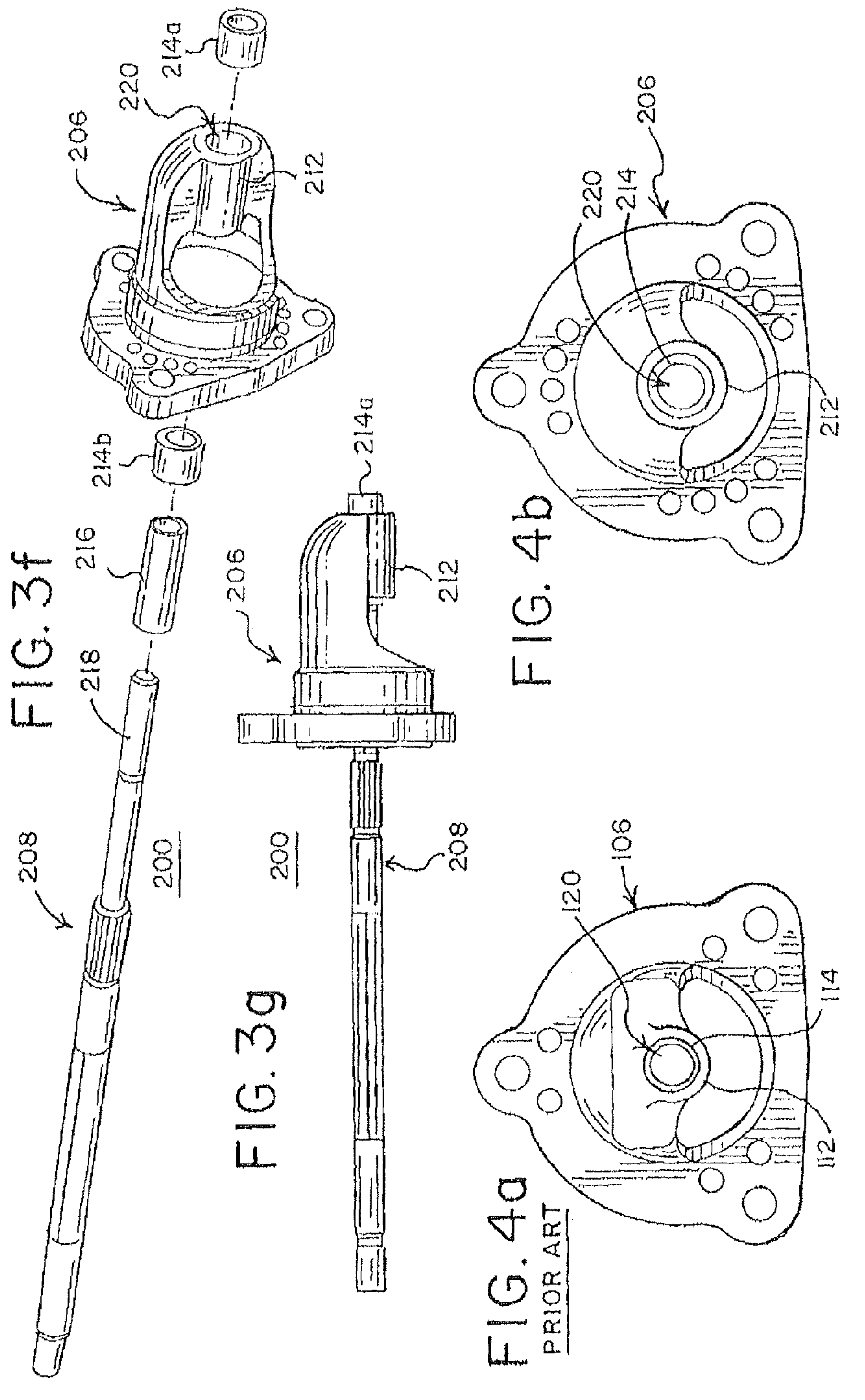
FIG. 4a PRIOR ART
FIG. 3*f* is another exploded view of the embodiment of the end casing of FIG. 3*a*.
FIG. 3*g* is a side view of the embodiment of the end casing of FIG. 3*a*.
FIG. 4*a* is a top view of the housing of a prior art locomotive starter motor.
FIG. 4*b* is a top view of the housing of the present invention locomotive starter motor.
Figure 5A:
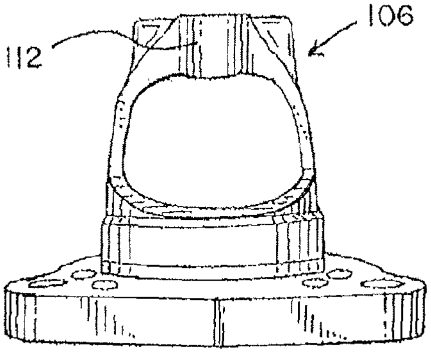
FIG. 5a PRIOR ART
FIG. 5*a* is a side view of the housing of FIG. 4*a*.
Figure 5B:
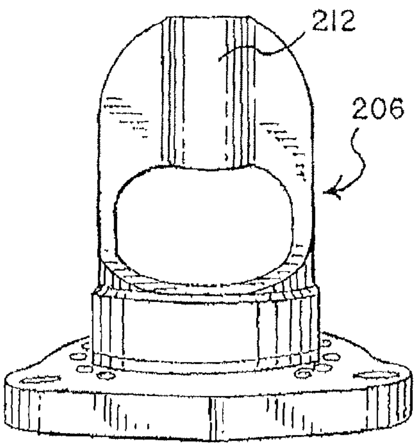
FIG. 5*b* is a side view of the housing of FIG. 4*b*.
Figure 6A:
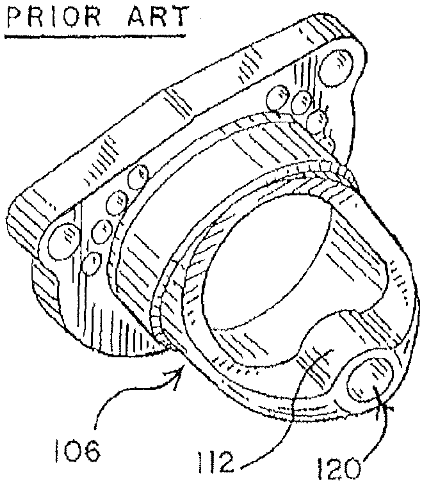
FIG. 6a PRIOR ART
FIG. 6*a* is a perspective view of the housing of FIG. 4*a*.
Figure 6B:
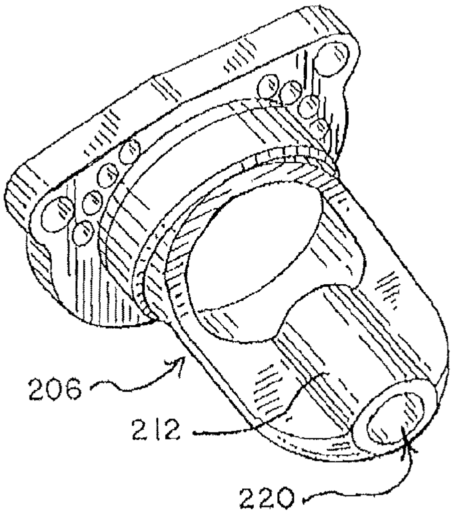
FIG. 6*b* is a perspective view of the housing of FIG. 4*b*.

In one embodiment, the needle bearing arrangement may be in the form of a single elongated roller bearing spanning the length of the end casing. Additionally, the needle bearing arrangement may be in the form of two roller bearings situated along side each other or a double bearing, as shown in FIGS. 3*a*, 3*c*, 3*f* and 3*g*, FIGS. 3*b*-6*b* illustrate the contrast between the prior art locomotive starter motor 100 and the present invention locomotive starter motor arrangement 200, and specifically the respective end casings 112, 212. The end casing 212 of the present invention starter motor 200 is generally longer and larger in diameter as compared to the prior art starter motor 100, as illustrated in FIGS. 3*b* and 3*c*. As shown in FIG. 3*b*, prior art locomotive starter motor housing 106 has a length ($B_1$) of about 4.898 inches. The end casing 112 of the prior art starter motor 100 defines a bore 120 therein for receiving the bushing 114. The length ($A_1$) of the prior art bore 120 is about 0.98 inches with an internal diameter ($C_1$) of about 0.864 inches. The bushing 114 has a length ($D_1$) of about 1.0 inches, an internal diameter ($E_1$) of about 0.625 inches, and an outer diameter of about 0.875 inches. Each bushing further has a load rating (1M rev) of about 5,890 lbs and a limiting speed for grease of about 4,200 rpm. A shaft 108 is connected to the end casing 112 and has a diameter ($F_1$) of about 0.623 inches.

In contrast, as shown in FIG. 3*c*, one embodiment of the present invention starter motor includes a housing having 206 a length ($B_2$) of about between about 5.917 inches and about 6.667 inches, and preferably about 6, 167 inches. In this embodiment, the end casing 212, attachable to the housing 206, defines a bore 220 therein for receiving a bearing arrangement (e.g., the bearings 214*a*, 214*b*). The length of the bore ($A_2$) of the end casing 212 is about 2.250±0.25 inches, preferably 2.250±0.125 inches, and more preferably 2.250 inches with an internal diameter ($C_2$) of about 1.125±0.25 inches, preferably 1.125±0.125 inches, and more preferably 1.125 inches. The bearings 214*a*, 214*b* each have the following dimensions: a length ($D_2$) of about 1.062 inches±0.25 inches, preferably 1.062±0.125 inches, and more preferably 1.062 inches; an internal diameter ($E_2$) of about 0.875±0.25 inches, preferably 0.875±0.125 inches, and more preferably 0.875 inches; and an outer diameter of about 1.125±0.25 inches, preferably 1.125±0.125 inches, and more preferably 1.125 inches. The bearings 214*a*, 214*b* each further have a load rating (1M rev) of about 5,320 lbs and a limiting speed for grease of about 8,700 rpm. The bearings 214*a*, 214*b* are connected by a sleeve 216 and received by the end casing 212. A shaft 208 is connected to the end casing 212. The tapered drive end 218 of the shaft received by the bearings 214*a*, 214*b*, has a diameter ($F_2$) of about 0.601±0.25 inches, preferably 0.601±0.125 inches, and more preferably 0.601 inches and a length ($G_2$) of about 2.875±0.25 inches, preferably 2.875±0.125 inches, and more preferably 2.875 inches. In one embodiment (not shown), the bearing arrangement may be in the form of a single elongated roller bearing spanning the length of the end casing (e.g., having a length of about 2.124±0.25 inches, preferably 2.124±0.125 inches, and more preferably 2.124 inches).

The longer and larger diameter of the end casing 212 of the present invention starter motor 200 is in part to support the rotation of the shaft 208 and also in part to accommodate the larger needle bearing 214*a*, 214*b*.

Moreover, the needle bearing may include a plurality of rotatable members or rollers engaging the shaft which allows the resulting load and wear to spread amongst the needle bearing members, instead of being concentrated on the bushing. In this way, the load is applied across the entire needle bearing and across a larger area as compared to the prior art hushing of FIG. 1. As a result, the field service life of the starter motor is increased.

The present invention starter motor has been described in accordance with the embodiments shown, and one of ordinary skill in the art will readily recognize that there could be variations to the embodiments, and any variations would be within the spirit and scope of the present invention. Thus, the starter motor is not intended to be limited to the embodiments shown, but is to be accorded the widest scope consistent with the principles and features described above. Accordingly, many modifications may be made by one of ordinary skill in the art without departing from the spirit and scope of the appended claims.

What is claimed:

1. A starter motor for a locomotive engine, the starter motor comprising:

a motor having an armature for driving a shaft carrying a pinion which engages a ring gear of the locomotive engine to be cranked or started, said shaft being supported for rotation by a needle bearing arrangement carded by an end casing attachable to the motor, wherein said needle bearing arrangement has a length of about 2.124 inches, an internal diameter of about 0.875 inches and an outer diameter of about 1.125 inches, and wherein said needle bearing further includes a plurality of rotatable steel bearing members each having a loading rating (1M rev) of about 5,320 lbs, and which engage the shaft to allow resulting load to spread amongst the plurality of rotatable steel bearing members.

2. The starter motor of claim 1, wherein the end casing defines a bore for receiving the needle bearing arrangement, and wherein the length of the bore is about 2.250 inches.

3. The starter motor of claim 1, wherein the needle bearing arrangement includes a plurality of needle bearings situated along side each other.

4. The starter motor of claim 1, wherein the needle bearings each have a limiting speed for grease of about 800 rpm.

5. The starter motor of claim 1, wherein the needle bearing arrangement is connected by a sleeve.

6. The starter motor of claim 1, wherein the shaft has a diameter of about 0.601 inches and a length of about 2.875 inches.

7. The starter motor of claim 1, wherein the needle bearing arrangement includes at least one roller bearing.

8. A starter motor for a locomotive engine, the starter motor comprising:

a motor having an armature for driving a shaft carrying a pinion which engages a ring gear of the locomotive engine to be cranked or started, said shaft being supported for rotation by a needle bearing arrangement carried by an end casing of a housing attachable to the motor, wherein said needle bearing arrangement has a length of about 2.124 inches, an internal diameter of about 0.875 inches and an outer diameter of about 1.125 inches, wherein said needle bearing further includes a plurality of rotatable steel members each having a load rating (1M rev) of about 5,320 lbs, and which engage the shaft to allow resulting load to spread amongst the members, and wherein the housing has a length of between about 5.917 inches and about 6.667 inches.

9. The starter motor of claim 8, wherein the housing has a length of about 6.167 inches.

10. The starter motor of claim 8, wherein the end casing defines a bore for receiving the needle bearing arrangement, and wherein the length of the bore is about 2.250 inches.

11. The starter motor of claim 8, wherein the needle bearing arrangement includes a plurality of needle bearings situated along side each other.

12. The starter motor of claim 11, wherein the needle bearings each have a limiting speed for grease of about 8,700 rpm.

13. The starter motor of claim 8, wherein the needle bearing arrangement is connected by a sleeve.

14. The starter motor of claim 8, wherein the shaft has a diameter of about 0.601 inches and a length of about 2.875 inches.

15. The starter motor of claim 8, wherein the needle bearing arrangement includes at least one roller bearing.

* * * * *